US008543322B1

(12) United States Patent
Nance

(10) Patent No.: US 8,543,322 B1
(45) Date of Patent: Sep. 24, 2013

(54) METHODS FOR DETERMINATION OF OPTIMUM SEQUENCE FOR AUTOMATED ACTIVATION OF ONBOARD AIRCRAFT WEIGHT AND BALANCE SYSTEM

(76) Inventor: C. Kirk Nance, Keller, TX (US)

( * ) Notice: Subject to any disclaimer, the term of this patent is extended or adjusted under 35 U.S.C. 154(b) by 0 days.

(21) Appl. No.: 13/415,887

(22) Filed: Mar. 9, 2012

Related U.S. Application Data

(60) Provisional application No. 61/452,328, filed on Mar. 14, 2011.

(51) Int. Cl.
*B64C 25/22* (2006.01)

(52) U.S. Cl.
USPC ............... 701/124; 701/15; 701/16; 701/120; 701/468; 73/1.78; 73/178 T

(58) Field of Classification Search
None
See application file for complete search history.

(56) References Cited

U.S. PATENT DOCUMENTS

| | | | |
|---|---|---|---|
| 3,182,498 A * | 5/1965 | Koletsky et al. ............. 73/178 T |
| 3,584,503 A | 6/1971 | Senour | |
| 3,701,279 A | 10/1972 | Harris et al. | |
| 4,792,904 A * | 12/1988 | Reinagel et al. ................ 701/17 |
| 5,214,586 A | 5/1993 | Nance | |
| 5,521,827 A | 5/1996 | Lindberg et al. | |
| 5,548,517 A | 8/1996 | Nance | |
| 5,583,777 A * | 12/1996 | Power ........................... 701/124 |
| 6,032,090 A | 2/2000 | von Bose | |
| 6,128,951 A | 10/2000 | Nance | |
| 6,237,406 B1 | 5/2001 | Nance | |
| 6,237,407 B1 * | 5/2001 | Nance ........................ 73/178 T |
| 8,024,078 B2 * | 9/2011 | Coulmeau et al. ................ 701/3 |
| 2006/0220918 A1 | 10/2006 | Stockwell et al. | |
| 2008/0215198 A1 * | 9/2008 | Richards ........................ 701/15 |
| 2009/0210105 A1 * | 8/2009 | Lusby et al. .................... 701/15 |

OTHER PUBLICATIONS

Federal Aviation Administration (FAA), Aircraft Weight and Balance Handbook #FAA-H-8083-1A.*
Wikipedia article, "Suspension (vehicle)".*

* cited by examiner

*Primary Examiner* — Helal A Algahaim
*Assistant Examiner* — Edward Torchinsky
(74) *Attorney, Agent, or Firm* — Geoffrey A. Mantooth

(57) ABSTRACT

A system and method for the determination for automated initiation of onboard aircraft weight and balance measurement systems. The system is used in monitoring, measuring, computing and displaying the weight and balance of aircraft utilizing telescopic landing gear struts. Pressure sensors, axle deflection sensors, and/or linkage rotation sensors are mounted in relation to each of the landing gear struts to monitor, measure and record strut and aircraft movement and rates of said movement experienced by landing gear struts, as the aircraft proceeds through typical ground and flight operations. Also, acceleration sensors and GPS can be used to monitor aircraft movements and positions during ground and flight operations. The system and method identify the position of the aircraft as related to airport ground operations to determine the optimum time to initiate an aircraft weight and balance measurement.

14 Claims, 10 Drawing Sheets

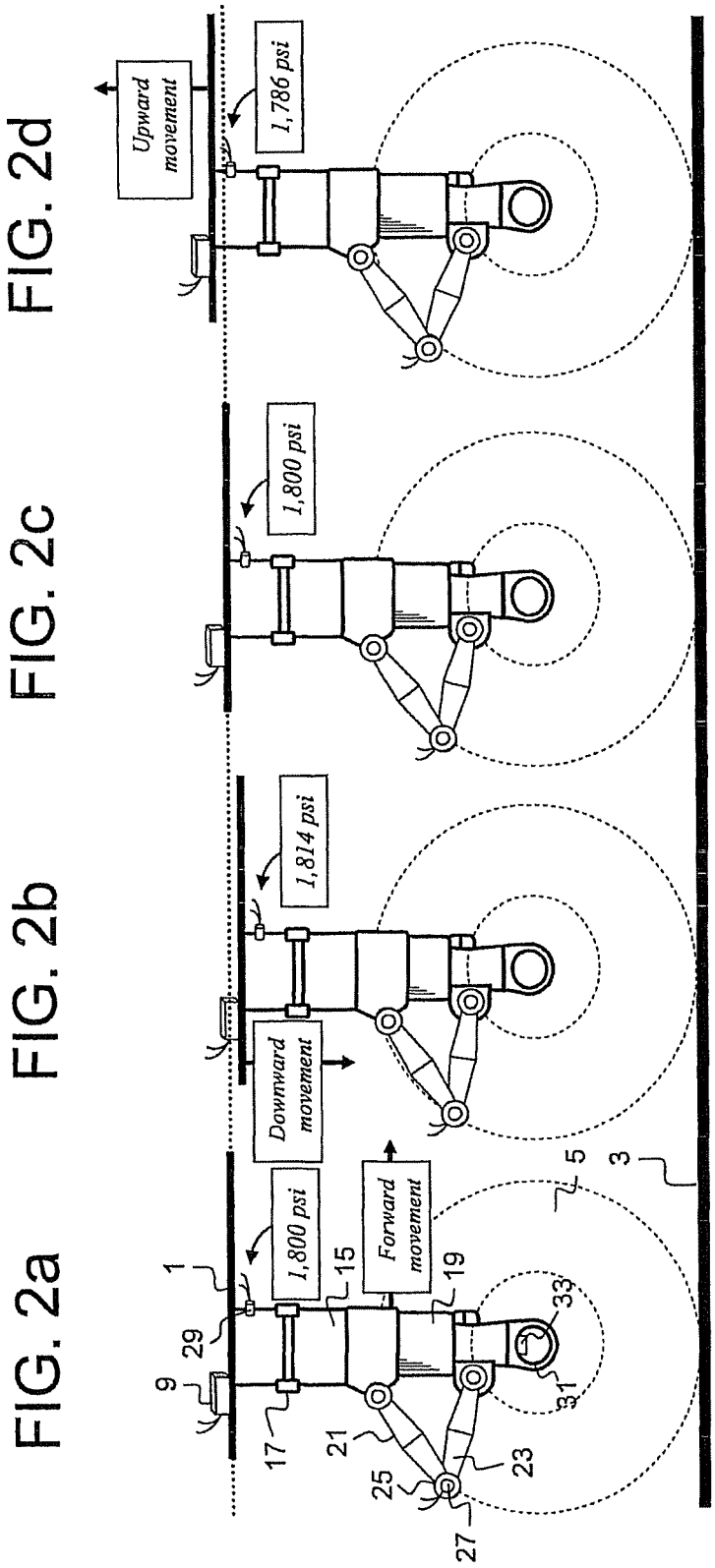

(axle deflection)

METHODS FOR DETERMINATION OF OPTIMUM SEQUENCE FOR AUTOMATED ACTIVATION OF ONBOARD AIRCRAFT WEIGHT AND BALANCE SYSTEM

This application claims the benefit of U.S. provisional patent application Ser. No. 61/452,328, filed Mar. 14, 2011.

BACKGROUND OF THE INVENTION

There are many critical factors the pilot of an aircraft must consider when determining if the aircraft is safe for take-off. One of those factors is identifying the proper weight and center of gravity for the aircraft. Hereinafter, "aircraft weight and center of gravity" will be referred to as "aircraft weight."

Typical aircraft used in day-to-day airline operations are commonly supported by a plurality of compressible, telescopic landing gear struts. These landing gear struts contain pressurized hydraulic fluid and nitrogen gas. The weight of the aircraft rests upon and is supported by theses "pockets" of compressed nitrogen gas, within the landing gear struts.

When measuring the weight of an aircraft, the aircraft weight can be classified into two types. The first type of weight is commonly referred to as "sprung weight." The sprung weight is the vast majority of the aircraft weight and is located/suspended above the "pockets" of compressed nitrogen gas, within the telescopic landing gear strut. The second type of weight is a much smaller amount of the total weight and is commonly referred to as "unsprung weight." Unsprung weight is the weight of the landing gear components which are located below the pockets of compressed nitrogen gas. The unsprung weight is virtually a constant and unchanging weight. Brake wear and tire wear are the only variations to unsprung weight; and in the consideration of the aircraft total weight, is a very minimal amount.

In the initial design and certification of aircraft, there are three different aircraft structural weight limitations which are established. These three weight limitations are predicated upon the structural design of the aircraft. Prior to each flight the pilot of the aircraft must assure throughout the operation of any flight, the aircraft remains within these certified structural weight limitations. The highest of these weight limitations is the "Maximum-Ramp Weight." The Max-Ramp Weight limitation is the heaviest weight that the aircraft is allowed to taxi. This weight is slightly higher than the aircraft "Maximum Take-off Weight." The higher Ramp Weight is to allow for the weight of fuel-burn, used for the aircraft to travel from the airport terminal gate to the starting point of the aircraft take-off roll. The Maximum Take-off Weight is the heaviest weight at which the aircraft is allowed to take-off. The third weight limitation is the "Maximum Landing Weight" limitation, which is the heaviest weight at which and aircraft is designed for landing.

In a search of the prior art, there are numerous, existing onboard aircraft weight and balance systems which measure aircraft weight. Research of the prior art to determine aircraft automatic aircraft weight and balance systems can be divided into two basic strategies. One strategy is the method of measuring the pressure within the landing gear strut. The other being the method of measuring the amount of landing gear axle bending/deflection, as the aircraft weight increases. Both of these approaches are well documented and reference may be made to United States patents:

| U.S. Pat. #3,584,503 Senour | U.S. Pat. #5,548,517 Nance |
| U.S. Pat. #3,701,279 Harris | U.S. Pat. #6,128,951 Nance |
| U.S. Pat. #5,214,586 Nance | U.S. Pat. #6,237,406 Nance |
| U.S. Pat. #5,521,827 Lindberg | U.S. Pat. #6,237,407 Nance |

U.S. Pat. No. 6,032,090 VonBose teaches the additional art of measuring landing gear strut friction which also uses the measurement of aircraft vertical acceleration in measuring aircraft landing gear strut seal friction and United States Patent Application Publication # US/2006/0220918-A1 Stockwell teaches the additional art of rotating landing gear strut seals in a means to reduce landing gear strut seal friction, which is used to reduce frictional errors, in the measurement of aircraft weight.

The prior art described by these patents explain mechanical apparatus added to the landing gear strut which measure the weight of the aircraft, but none of these prior art designs offer a "non-human interfacing" to determine any particular segment of the aircraft operation, to further determine an optimum time to initiate an fully automated function, for determining the aircraft weight measurement.

The technology described in this application offers improvements to these prior art aircraft weight and balance systems. Where each of the existing systems offer aircraft weight measurements upon the physical and manual request by a human, this new technology offers methods of an artificial intelligence within the aircraft weight measuring system's software, which can be applied to any of the prior art systems. Aircraft weight and aircraft location upon and around the airport can be determined, as well as determining the optimum time to make an automated request for a measured, recorded and then stored aircraft weight determination.

In further defining the optimum time for requesting aircraft weight determination, a review of typical airline operations can herein be examined. In most of today's airline operations, the deteitnination of aircraft weight is accomplished by a method of determining the number of passengers which are to board onto the aircraft, and multiplying that number of passengers times an assumed average passenger weight value. Such average passenger weight has been determined by previous population weight survey data. In continuation of the process to determine aircraft weight, there is a determination as to the amount of weight for the luggage and bags which each passenger checked at the airline ticket counter, to then be loaded onto the aircraft and stored within the aircraft cargo compartment. An "average bag weight" for each particular size and shape of each piece of luggage is determined, and that determined average bag weight is multiplied times the number of bags loaded onto the aircraft, to determine this total cargo weight. On larger aircraft, which transport the much heavier palletized cargo, each pallet is actually weighed, and that measured weight is used in the aircraft weight calculations. Aircraft fuel is measured by gallons and pumped into the aircraft fuel tanks. Onboard aircraft fuel indicators further convert the number of gallons pumped, into the pounds of weight added to the aircraft. Aircraft fuel indicators incorporate a density compensation feature which can have errors as high as 2% of that fuel weight. With a long-haul aircraft such as may travel from the US to Europe, the weight of the fuel can be up to 25% of the entire weight of the aircraft.

This aircraft weight calculation is referred to as the "dispatch weight" of the aircraft. Sometimes this term "dispatch weight" is referred to as the "primary dispatch weight and center of gravity."

Weeks before an airline flight is scheduled to dispatch, the airline begins the process to plan the anticipated loads and weight for that flight. The development of this "planned load" involves the tracking of ticket and cargo sales for that particular flight segment. Additionally, weather and wind patterns, both current and historic are reviewed to offer recommendations as to the amount of fuel which should be needed and will be loaded onto the aircraft, for this particular flight.

Where a "measured" aircraft weight would be the most accurate means to determine aircraft weight, having an accurate measured weight can cause operational problems for an airline. As a scheduled airline flight draws near to its scheduled departure time, having weight data based on calculations of historical weight survey data (as opposed to an accurate measured weight) insures that the airline's "planned weight" will always match the airline's "dispatch weight." Having a planned aircraft weight value that does not exactly match a dispatch weight value (which would be mechanically measured just after the aircraft has completed the loading process) can cause extremely difficult operational problems for the airline, just minutes prior to the time of the aircraft departure. Regulatory authorities who administer the safe operation of such airlines would not allow such weight discrepancies to remain unresolved, and thus not allow that aircraft to dispatch without determining the discrepancy. By not having the more accurate aircraft weight data made available, just before and aircraft is ready to take-off, is operationally of more benefit to the airline procedures, as opposed to having an accurately measured aircraft weight available for the primary dispatch of the aircraft.

Though the more accurate aircraft weight and center of gravity measurement could be a disruptive factor for primary dispatch, the measured weight information is a valuable tool in the measuring of aircraft performance. Aircraft and engine performance is related to the amount of fuel burned on a particular flight. The amount of fuel which is burned relates to the amount of weight which that aircraft carries up to altitudes in excess of 30,000 feet.

Many of today's airlines are initiating programs to improve overall operational efficiency. A commonly used program is called FOQA (Flight Operation Quality Assurance). These FOQA programs monitor multiple streams of data and onboard aircraft sensor information to measure items such as airspeed, rate of altitude change, rate of fuel consumption and other factors which affect the performance of the aircraft.

Having the ability to measure and record the aircraft weight information without the participation of aircraft flight and/or ground crew, and further storing the aircraft weight data for use in measuring aircraft performance, is of benefit in measuring aircraft performance. Additionally, having validations of aircraft center of gravity loading trends can be used in future operations, to better plan aircraft loading patterns; that a more optimum aircraft center of gravity could be achieved. Having an aircraft fly with its center of gravity located at a more aft position, within its center of gravity limitations allows the aircraft to reduce aerodynamic drag, and thus burn less fuel on each flight.

Creating the process for which an automated method to capture measured aircraft weight and balance, which utilizes sensors on each landing gear strut, and an onboard computer which monitors those sensors measurements, with the ability to recognize when an aircraft is at rest; being loaded with passengers, cargo and fuel; which has left the departure gate as is beginning to taxi towards the departure runway; which recognizes that additional weight (such as deicing fluid) is being applied to the aircraft; and is further proceeding along a runway for take-off; and later completes a landing event; begins its post landing taxi towards an arrival gate; and finally comes to rest at the airport terminal gate; will allow for aircraft weight information to be independently measured and stored, for future use.

The method described herein is applicable as an improvement to existing prior art aircraft weight and balance measuring systems, to make the prior art functional for features which they were not initially intended.

Further, the method described herein eliminates the need for any human interface in the process of initiating a request for an aircraft weight determination, but instead offers an artificial intelligence feature within the software of any of a number of weight and balance system computers, wherein this new method determines when the weight measurement should be made. Aircraft weight increases and decreases are monitored to detect patterns of change over defined periods of time. The detected patterns will create triggers as to when an aircraft weight measurement should be made and recorded.

SUMMARY OF THE INVENTION

It is an object of the present invention to provide a tool to automatically, without human interface, determine when to measure aircraft weight during various segments of the aircraft operation or movement, prior to and after the aircraft flight segment.

It is another object of the present invention to provide a tool to compile and trend aircraft weight and center of gravity measurements, to be used to better indicate the various weights of an aircraft throughout the pre-flight, flight and post-flight operations, as compared to Regulatory weight limitations.

It is another object of the present invention to provide a method for identifying that the aircraft is at rest, prior to payload weight being added to the empty weight of the aircraft, prior to aircraft departure from the terminal gate.

It is another object of the present invention is to provide a method for identifying that the aircraft is at rest, after payload and fuel weight has been added to the empty weight of the aircraft, prior to aircraft departure from the terminal gate.

It is another object of the present invention is to provide a method for identifying that the aircraft has departed a terminal gate, after payload and fuel weight have been added to the empty weight of the aircraft, prior to aircraft taking-off from the ground.

It is another object of the present invention is to provide a method for identifying that the aircraft has landed onto an arrival runway and request a determination of the aircraft landing weight, prior to the aircraft reaching the terminal arrival gate.

It is another object of the present invention is to provide a method for identifying a time or occasion in the operation of the aircraft of requesting an aircraft weight, during the aircraft loading process.

It is another object of the present invention is to provide a method for identifying and verifying an aircraft is within its "Ramp Weight" limitation, as the aircraft begins to taxi, immediately after departure from a terminal gate.

It is another object of the present invention is to provide a method for requesting the determination of an aircraft weight after the application of de-icing fluid onto the aircraft, as the aircraft completes the taxi, immediately before the aircraft take-off roll down the airport runway.

It is another object of the present invention is to provide a method for identifying an aircraft "Take-Off Weight" as the aircraft completes the taxi, immediately before the aircraft take-off roll, down the airport runway.

The present invention provides a method of determining when to activate an onboard aircraft weight system in an aircraft. The aircraft is capable of performing plural operational segments and has landing gear struts. The movement of the aircraft is monitored. Based on the monitored aircraft movement, the operational segment of the aircraft is determined. For a specified operational segment, requesting that a determination of the aircraft weight be made by the onboard weight system.

In accordance with one aspect, the step of monitoring the aircraft movement further comprises the step of monitoring fluid pressure in the landing gear struts.

In accordance with another aspect, the aircraft landing gear comprises wheels mounted on the respective wheel axles. The step of monitoring the aircraft movement further comprises the step of monitoring deflection of at least one of the wheel axles.

In accordance with another aspect, the step of monitoring the aircraft movement further comprises the step of monitoring the acceleration of the aircraft.

In accordance with another aspect, the landing gear struts further comprise strut linkages, wherein the step of monitoring the aircraft movement further comprises the step of monitoring the movement of the strut linkages on at least one of the landing gear struts.

In accordance with another aspect, the step of monitoring the aircraft movement further comprises the step of monitoring the movement of the aircraft using a global positioning satellite receiver.

In accordance with another aspect, the step of determining the aircraft operational segment further comprises the step of determining when the aircraft is located at a loading station.

In accordance with another aspect, the step of requesting that a determination of the aircraft weight be made further comprises the step of requesting that a determination of a ramp weight of the aircraft be made.

In accordance with another aspect, the step of determining the aircraft operational segment further comprises the step of determining when the aircraft is near take-off.

In accordance with another aspect, the step of requesting that a determination of the aircraft weight be made further comprises the step of requesting that a determination of a take-off weight of the aircraft be made.

In accordance with another aspect, the step of determining the aircraft operational segment further comprises the step of determining when the aircraft has landed after a flight.

In accordance with another aspect, the step of requesting that a determination of the aircraft weight be made further comprises the step of requesting that a determination of a landing weight of the aircraft be made.

BRIEF DESCRIPTION OF THE DRAWINGS

Although the features of this invention, which are considered to be novel, are expressed in the appended claims, further details as to preferred practices and as to the further objects and features thereof may be most readily comprehended through reference to the following description when taken in connection with the accompanying drawings, wherein:

FIGS. 2a, 2b, 2c, and 2d are side views of a typical regional aircraft landing gear strut, where various elements of the invention are attached to the landing gear strut and are identified on FIG. 2a; where further FIGS. 2b-2d illustrate the strut as it moves vertically up and down, as the aircraft moves horizontally along an airport taxiway or runway.

DETAILED DESCRIPTION OF THE PREFERRED EMBODIMENT

Figure 1:
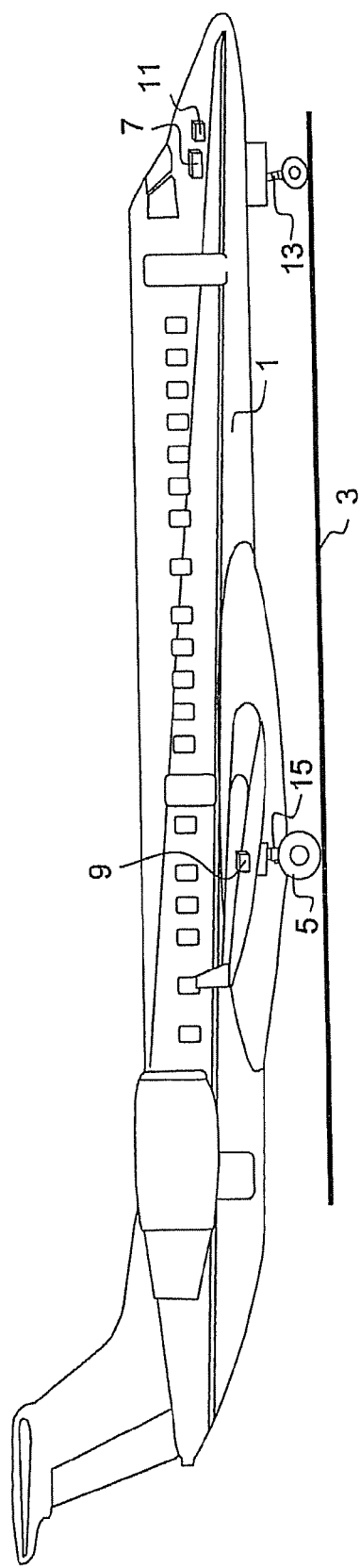
FIG. 1 is a view of a typical regional aircraft, with a tricycle type landing gear in the extended position, resting on the ground; with various components of the invention.

An aircraft is typically supported by plural landing gear struts. In many if not most cases, aircraft are supported by three landing gear struts. Each landing gear strut is designed much like, and incorporates many of the features of, a typical telescopic shock absorber. The shock absorber of the landing gear strut comprises internal fluids, of both hydraulic oil and compressed nitrogen gas. More simply said the weight of an aircraft rests on three pockets of compressed nitrogen gas. The aircraft weight is transferred to and is identified by the pressures contained within the landing gear struts. Weight is proportional to pressure measured in "psi" (pounds per square inch).

The weight supported by these pockets of compressed gas is transferred down the landing gear strut to the landing gear wheel axles, which bear the load supported by the landing gear tires. As weight is added to the aircraft, the axles will bend and deflect. As an alternate means of determining aircraft weight, the bending/deflection of an aircraft axle can be measured and such deflection is directly proportional to the additional amount of weight added. The deflection of the landing gear axles represent the same load as supported by the pockets on compressed nitrogen gas, thus both methods of determining aircraft weight are parallel.

The present invention offers a modification and improvement to the above described "prior art" aircraft weight and balance systems. The enhancement described herein incorporates an "artificial intelligence" methodology, where the actuation of the aircraft weight measurement system is automatically initiated, without the need of human interface, with such decisions for initiating the automatic activation being made, both when the aircraft is stationary and/or moving, and at the most opportune times during the aircraft ground and flight operations.

Movement of the aircraft is detected in one of a number of ways:
1) aircraft acceleration—is monitored and measured with one or more accelerometers that monitor horizontal and vertical movement of the aircraft hull;
2) GPS—use of an onboard Global Positioning System allows for the tracking of the movement of the aircraft, anywhere on the airport grounds for which it is currently operating;
3) telescopic strut movement—is determined by measuring strut pressure changes, and in greater detail strut pressure spikes, being rapidly occurring minor increases and decreases to strut pressure within the landing gear shock absorber by pressure sensors that monitor the internal working pressure of the landing gear strut;
4) hinged movement of landing gear strut components—is determined through measurements made by rotation sensors located on rotating elements of the landing gear strut;
5) axle deflection—is determined through measurements made by strain gauge sensors located on the bending elements of the landing gear axle.

One or more of the above can be used to detect aircraft movement. Upon detection of telescopic movement of a respective landing gear strut, the step of monitoring the rate of strut telescopic movement and the direction of strut telescopic movement, and monitoring oscillation of landing gear axle deflection, along with monitoring of rotation sensors to identify strut hinge movement, along with aircraft hull acceleration, as well as monitoring GPS tracking the aircraft hull are used to determine if the aircraft is moving, or remains at rest.

Referring now to the drawings, wherein like reference numerals designate corresponding parts throughout the several views and more particularly to FIG. 1 thereof, there is shown a typical regional aircraft 1, with tricycle landing gear configuration consisting of a nose landing gear 13, and also shown one of two identical main landing gears 15. Landing gear 15 incorporates one or more tires 5 to distribute the weight of aircraft which is resting on the ground 3. Electronic elements which together are used in this invention, and are attached to aircraft 1 are an aircraft weight and balance system 7, typical multi-axis accelerometer 9 and typical GPS system 11. The accelerometer 9 and GPS system 11 are conventional and commercially available.

The use of regional aircraft is by way of an example, as the apparatus and methods described herein can be used on most types of aircraft.

As the aircraft 1 operates, it moves from one segment of operations, or operational segment, to another. For example, referring to FIG. 1a, a number of operational segments of aircraft are shown. One aircraft 16A is shown at a loading operational segment. The loading segment is at a gate of an airport terminal. A jet way extends from the terminal to the aircraft. Another example of a loading segment 16B is with the aircraft parked on the apron. Passengers and cargo are brought out to the aircraft. Still another operational segment 16C is when the aircraft taxis. Taxiing occurs between the loading station (for example, a terminal gate or an apron location) and the runway. Still another operational segment 16D is at a de-icing station. The aircraft taxis to and from the de-icing station. Still another operational segment 16E is when the aircraft undergoes a take-off roll on the runway. The aircraft accelerates, lifting off from the ground and taking flight. An aircraft in flight is another operational segment 16F. When the flight nears an end, the aircraft approaches the runway for landing, operational segment 16G. Upon touch down, the aircraft rolls on to runway for operational segment 16E and then exits to taxi for operational segment 16C to the loading station.

Referring now to FIG. 2a there is shown a side view of a typical aircraft telescopic landing gear strut 15, further identifying landing gear strut cylinder 17, in which strut piston 19 moves telescopically within strut cylinder 17. Strut piston 19 is prevented from rotation within strut cylinder 17 by a torque-link mechanism which incorporates an upper torque-link member 21 and a lower torque-link member 23 joined at a torque-link hinge 25. A "scissor-action" movement is created by the rotation of the torque-link hinge 25 connected to both upper torque-link member 21 and lower torque-link member 23. The identification and measurement of landing gear torque-link hinge 25 movement is measured by a rotation sensor 27. Main landing gear tire 5 is mounted onto a typical landing gear wheel and is connected to strut piston 19 at the landing gear axle 31.

Movement of aircraft hull 1 is additionally monitored by accelerometer 9. Pressure within landing gear 15 is monitored by a pressure sensor 29. Deflection/bending of main landing gear axle 31 is measured by a strain gage sensor 33.

Referring now to FIG. 2b, FIG. 2c and FIG. 2d there are shown examples of a continuation from FIG. 2a where aircraft 1 has begun to move. Horizontal movement of aircraft 1 causes the weight supported by the compressible nitrogen gas contained within the telescopic strut 15 to surge and oscillate both up and down. This vertical movement of aircraft 1 is shown by increasing and decreasing internal strut pressure, as aircraft 1 moves horizontally along the ground 3. As the aircraft moves from the location in FIG. 2a to subsequent locations, the aircraft moves down slightly (FIG. 2b), then back up (FIG. 2c) and even up higher than in FIG. 2a (FIG. 2d). As the aircraft moves up and down, the pressure sensor 29 senses the varying pressure inside the strut—1800, 1814, 1800 and 1786 psi respectively. In addition, the accelerometer 9 senses the aircraft movement, as does the axle strain gauge sensor 33, and the rotation sensor 27. Such movement by the aircraft can occur, for example, during taxiing.

Figure 3:
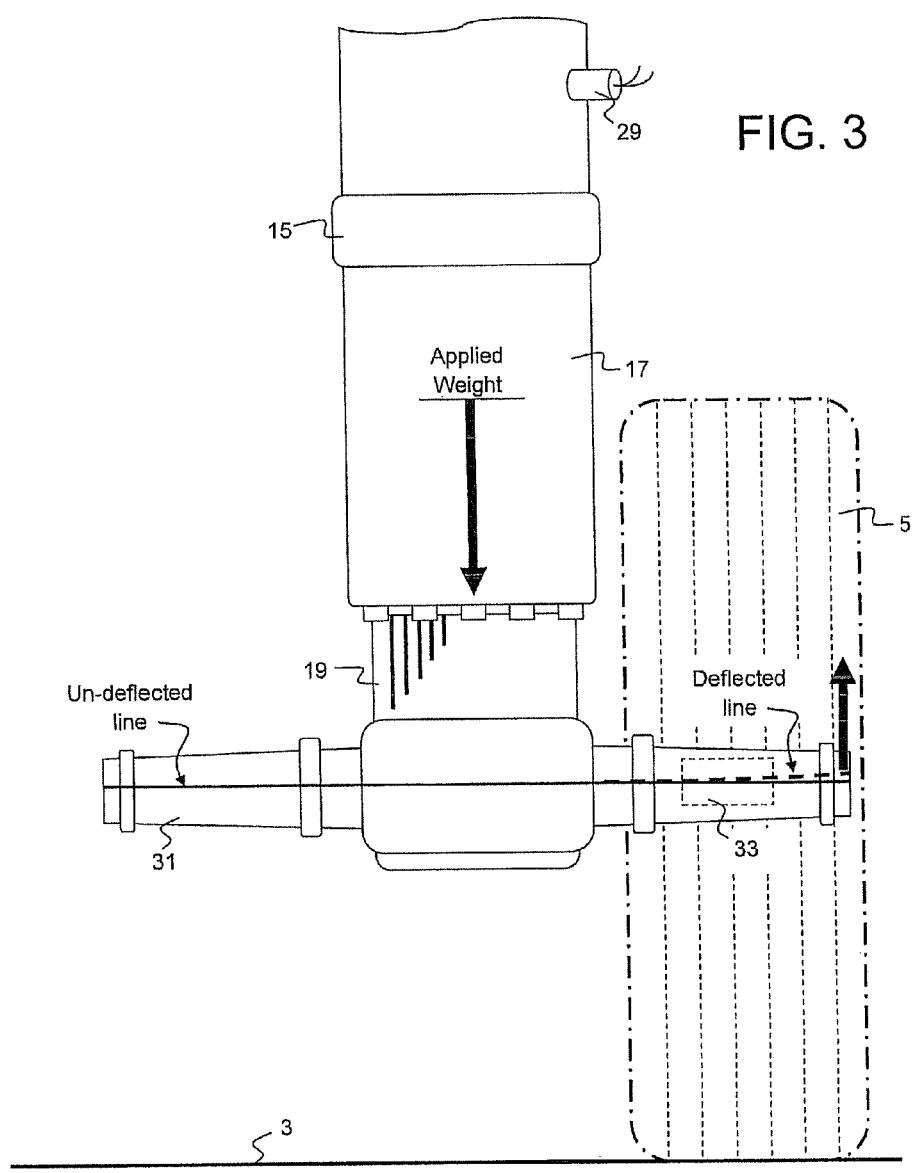
FIG. 3 is a front view of a typical regional aircraft landing gear strut, where various elements of the invention are attached to the landing gear strut.

Referring now to FIG. 3, there is shown a front view of main landing gear 15, where telescopic piston 19 recedes into strut cylinder 17 as weight is applied to the aircraft. The landing gear tire 5 supports that same applied weight, as it is further transferred to the ground 3. Pressure sensor 29 monitors and measures the changing pressure within strut 15. As weight is applied to strut (as shown by downward pointing vertical arrow) landing gear axle 31 deflects (as shown by the dashed line) and yields to the additional weight. Such applied weight can occur while the aircraft is being loaded, or during taxiing operations (see FIG. 2b).

A bold solid line is shown running horizontal across the center-line of landing gear axle 31 and represents an un-deflected posture of the landing gear axle 31. As weight is added to axle 31 that axle 31 will deflect. A bold dashed line representing deflection of axle 31 is shown running adjacent to the un-deflected solid line. (For illustrative purposes, the dashed line is only shown on one end of the axle 31.) The amount of deflection of landing gear axle 31 is directly proportional to the amount of weight applied. As weight is applied to the aircraft, telescopic piston 19 will recede into landing gear strut cylinder 17, thus increasing internal strut pressure. Internal strut pressure is monitored by pressure sensor 29. The amount of pressure increase, as recorded by pressure sensor 29, is directly proportional to the amount of weight applied. With applied weight being proportional to axle deflection, and the same applied weight being proportional to an increased strut pressure, it is understood that increased strut pressure is directly proportional to the amount of axle deflection.

Figure 4:
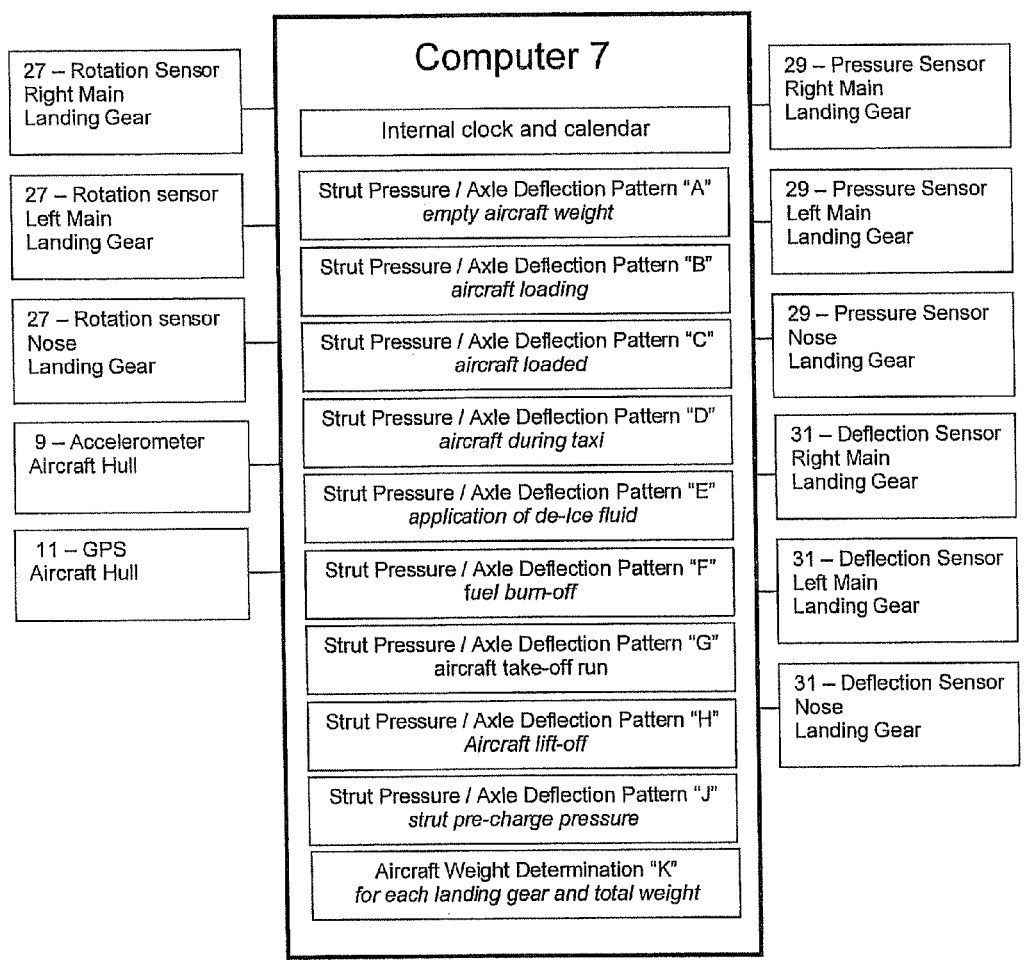
FIG. 4 is a schematic diagram of the onboard computer, sensor inputs and software programs of the invention.

Referring now to FIG. 4, there is shown a block diagram illustrating the apparatus of the invention, with multiple (nose, left-main and right-main landing gear) pressure sensors 29, and multiple landing gear torque-link movement monitoring rotation sensors 27, and axle deflection measuring strain gage sensors 31, along with hull monitoring accelerometer 9 and aircraft locating GPS System 11, which are all sources of data that provide inputs into weight and balance computer 7. Computer 7 is equipped with an internal clock and calendar to document the time and date of stored data. Computer 7 has multiple software packages which include:

Strut Pressure/Axle Deflection Pattern "A"—a software routine for monitoring aircraft landing gear strut pressure or wheel axle deflection to determine the aircraft is stationary and is near the aircraft empty operating weight.

Strut Pressure/Axle Deflection Pattern "B"—a software routine for monitoring aircraft landing gear strut pressure or wheel axle deflection to determine the aircraft is stationary and weight is being added, in other words, the aircraft is being loaded with cargo, passengers, fuel, etc.

Strut Pressure/Axle Deflection Pattern "C"—a software routine for monitoring aircraft landing gear strut pressure or wheel axle deflection to determine the aircraft is stationary and weight has been added, but aircraft weight is now constant.

Strut Pressure/Axle Deflection Pattern "D"—a software routine for monitoring aircraft landing gear strut pressure or wheel axle deflection, identifying strut pressure oscillations or spikes and changing axle deflection to determine the aircraft is moving, thus no weight can be added, and the pressure patterns are trending lower identifying a reduction in aircraft weight caused by the burning of fuel.

Strut Pressure/Axle Deflection Pattern "E"—a software routine for monitoring aircraft landing gear strut pressure or wheel axle deflection to determine the aircraft is stationary and additional weight has being added, which occurs after the aircraft has moved from the aircraft gate, thus determining the additional weight would be non-payload weight, such as de-icing fluid.

Strut Pressure/Axle Deflection Pattern "F"—a software routine for monitoring aircraft landing gear strut pressure or wheel axle deflection to determine the aircraft is stationary with pressure trending lower and axle deflection reducing, thus weight is being removed, which occurs after the aircraft has moved from the aircraft gate, thus determining the removed weight would be the weight of burned fuel.

Strut Pressure/Axle Deflection Pattern "G"—a software routine for monitoring aircraft landing gear strut pressure or wheel axle deflection, identifying strut pressure oscillations or spikes and changes in axle deflection to determine the aircraft is moving and accelerating, thus no weight can be added, and the pressure and deflection patterns are rapidly trending lower identifying a reduction in aircraft weight caused by the aircraft take-off roll and wing-lift is causing the weight reduction.

Strut Pressure/Axle Deflection Pattern "H"—a software routine for monitoring aircraft landing gear strut pressure or wheel axle deflection identifying a rapid reduction in strut pressure to its minimum "pre-charge" pressure and axle deflection to a neutral position, thus determining the aircraft has left the ground and the strut has extended to its full telescopic extension.

Strut Pressure/Axle Deflection Pattern "J"—a software routine for monitoring aircraft landing gear strut pressure or wheel axle deflection, identifying strut pressure stabilization at the strut "pre-charge" pressure and axle deflection to a neutral position, thus determining the aircraft has taken off and is in flight.

Although not shown in FIG. 4, additional software routines can be provided for in-flight and landing:

Strut Pressure/Axle Deflection Pattern "K"—a software routine for monitoring aircraft landing gear strut pressure or wheel axle deflection identifying that strut pressure remains at a "pre-charge" pressure, although slightly reduced due to in-flight cooling at altitude, and axle deflection at a neutral position, thus determining that the aircraft remains in flight.

Strut Pressure/Axle Deflection Pattern "L"—a software routine for monitoring aircraft landing gear strut pressure or wheel axle deflection identifying that strut pressure increases rapidly over a short period of time, and increased axle deflection, thus determining that the aircraft is landing.

Strut Pressure/Axle Deflection Pattern "M"—a software routine for monitoring aircraft landing gear strut pressure or wheel axle deflection identifying strut pressure oscillations or spikes and changing axle deflection to determine the aircraft has landed and is moving by taxiing.

Aircraft Weight Determination "N"—a software routine that utilizes the strut pressures, axle deflections or rotation sensor information to determine the aircraft weight supported by each landing gear strut and then totals the weights to find the total aircraft weight. Aircraft Weight Determination "N" is described in my earlier U.S. Pat. Nos. 5,214,586; 5,548,517; 6,128,951; 6,237,406; 6,237,407 and 6,293,141, the complete disclosures of which are incorporated herein by reference.

The computer 7 takes the data inputs from the sensors 9, 11, 27, 29, 31 and compares the data to one of the patterns. For the landing gear sensors 27, 29, 31, the data comparison is performed for each landing gear (nose, right main, left main). One or more of the types of landing gear sensors can be used, for example only pressure sensors 29 or pressure sensors together with axle deflection sensors 31.

Figure 5:
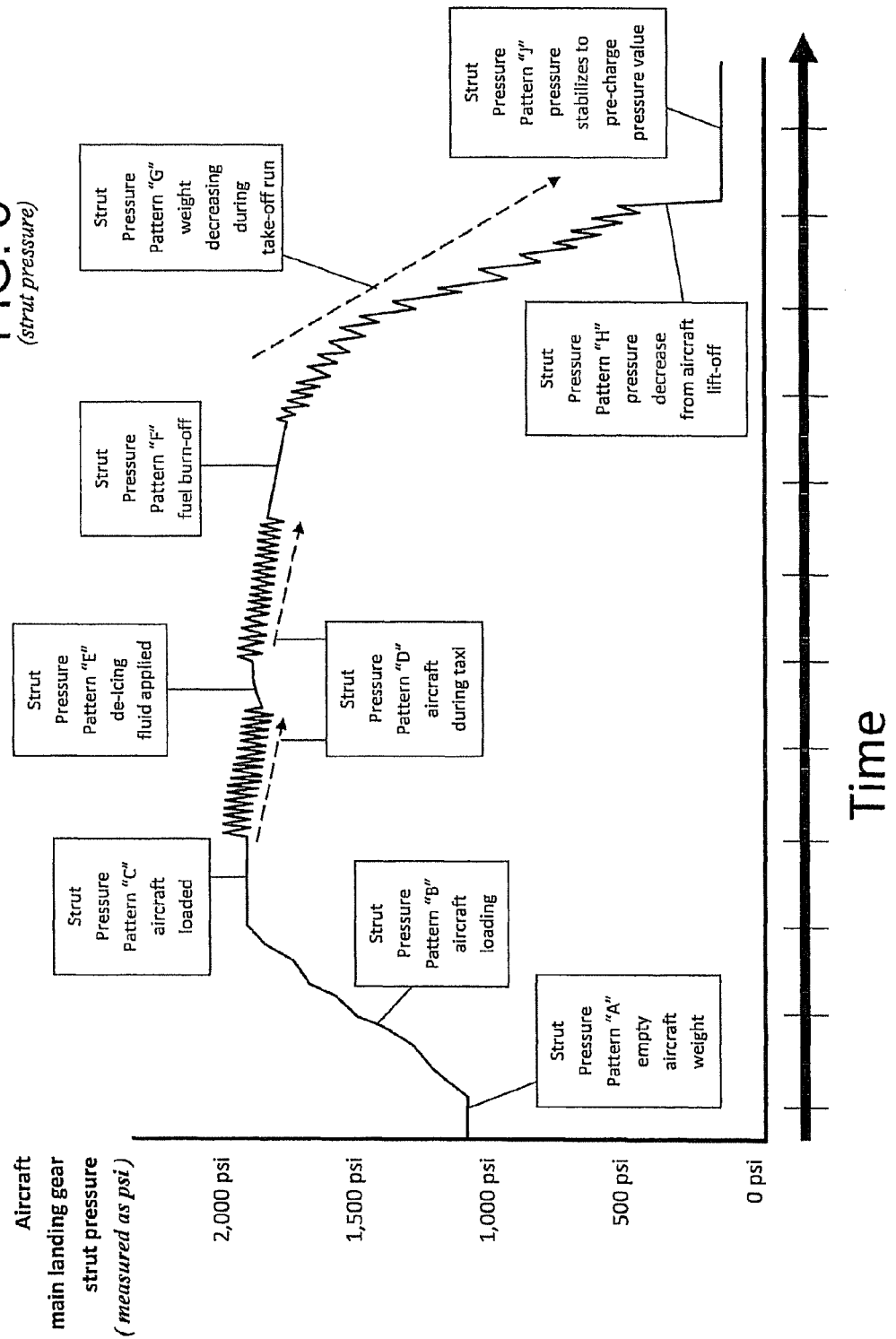
FIG. 5 illustrates the variations in the static and then changing internal landing gear strut pressure, as the aircraft stands at rest, as the aircraft is loading, and as the aircraft progresses through the various stages of ground and flight operations and various operational locations.

Referring now to FIG. 5, there is shown a graph illustrating measured landing gear strut pressure, as it would be monitored during a typical aircraft ground and flight operation. Landing gear strut pressure is measured as psi (pounds per square inch). Landing gear strut pressure is monitored in relation to elapsed time.

In this example, the empty weight of the aircraft relates to a right main landing gear pressure measured slightly above 1,000 psi. Landing gear Strut Pressure Pattern "A" will recognize a strut pressure within this lower pressure range, with no pressure increases or decreases and the aircraft stationary, as time passes. This unchanging pressure, at this minimal amount, will identify that the aircraft is stationary and is at or near its empty weight.

With the further continuous monitoring of strut pressure there will be shown a steady, but not necessarily "straight line", pattern of pressure increases, and the aircraft is stationary, to create Strut Pressure Pattern "B". Strut Pressure Pattern "B" identifies the initial loading of weight onto the aircraft. As loading may be interrupted, and then resumed, the pressure increases may be intermittent.

When the loading of the stationary aircraft is completed, the monitored strut pressure will stabilize and continue at a constant value as additional time passes. This horizontal "flat-lining" of monitored strut pressure, at this higher pressure range, relates to the higher ranges of the aircraft weight limitations and creates Strut Pressure Pattern "C". Strut Pressure Pattern "C" is further confirmed by being identified immediately prior to Strut Pressure Pattern "D". This is the time or the operational segment of the aircraft when to take the ramp weight of the aircraft. A request for taking the aircraft weight is made by calling the Aircraft Weight Determination "K" program.

Strut Pressure Pattern "D" identifies the aircraft as no longer stationary. The horizontal movement of the aircraft causes the landing gear internal strut pressure to oscillate with minor spikes of pressure increases and decreases. As the aircraft is moving, the aircraft engines are burning fuel. The reduction in aircraft weight, as a result of the burned fuel is identified by the averaging of the high and low range of the multiple strut pressure spikes. The averaged pressure will trend slightly lower as the weight of the burned fuel is removed from the aircraft fuel tanks. Note that the aircraft may move and then stop and move again. Such intermittent movement may be found such as when the aircraft is in line for take-off.

Depending upon weather conditions, the aircraft may require the application of de-icing fluid. De-icing fluid is applied while the aircraft is stationary, thus the pressure spikes indicating aircraft movement will cease, allowing the strut pressure to again stabilize. The stabilized pressure will slowly begin to increase as the weight of the de-icing fluid is applied to the aircraft is identified by Strut Pressure Pattern "E". Strut Pressure Pattern "E" is further confirmed by being identified immediately after Strut Pressure Pattern "D", preceding another Strut Pressure Pattern "D", and within a relatively short period of time before Strut Pressure Pattern "G", which identifies the aircraft take-off roll.

Strut Pressure Pattern "F" is identified by an again cessation of landing gear strut pressure spikes of Strut Pattern "D", where strut pressures will again stabilize and slowly trend lower, as additional fuel is burned to reduce aircraft weight to an amount that is below the Max-Takeoff Weight. Strut Pressure Pattern "F" is further confirmed by being identified immediately prior to Strut Pressure Pattern "G", which identifies the aircraft take-off roll. Strut Pressure Pattern "F" may also occur when the aircraft is waiting in line for take-off. This is the time or the operational segment of the aircraft when to take the take-off weight of the aircraft. A request for taking the aircraft weight is made by calling the Aircraft Weight Determination "K" program.

Strut Pressure Pattern "G" identifies the beginning and completion of the aircraft take-off roll. Again, landing gear strut pressure will begin to oscillate, showing a pattern of high and low pressure spikes, but in the case of Strut Pressure Pattern "G" the difference or "delta pressure" between the high and low pressure spikes will increase as well as the averaging of these pressure spikes will trend sharply lower, as the aircraft increases speed and the lifting forces of the wings transfer weight from the landing gear to the aircraft wings.

As the aircraft takes-off and the landing gear are no longer in contact with the ground, the pressure within the landing gear strut will reduce to an amount equivalent to the landing gear pre-charge pressure. Determination of this reduction of pressure immediately after the aircraft take-off identifies Strut Pressure Pattern "H".

Monitored strut pressure which stabilizes to the landing gear pre-charge pressure identifies Strut Pressure Pattern "J".

The landing gear pre-charge pressure is the minimum amount of pressure which is maintained within the landing gear strut, when the landing gear strut is extended to its full telescopic extension. This pre-charge pressure is maintained to insure the aircraft landing gear strut is at full telescopic extension prior to the next landing event.

Figure 6:
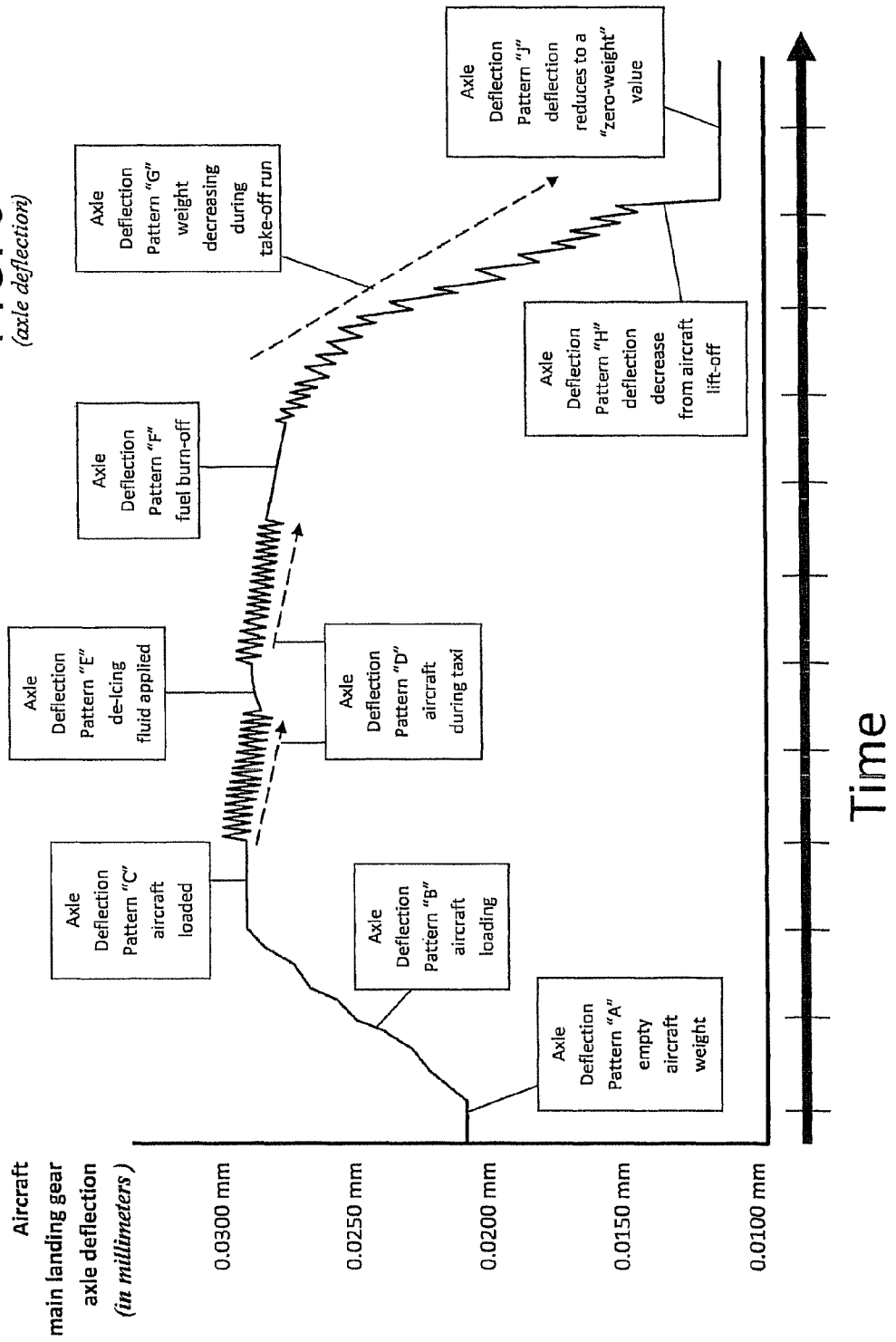
FIG. 6 illustrates the variations in the static and then changing landing gear axle deflection, as the aircraft stands at rest, as the aircraft is loading, and as the aircraft progresses through the various stages of ground and flight operations and various operational locations.

Referring now to FIG. 6 there is shown a graph illustrating measured landing gear axle deflection, monitored by strain gauge sensors, as it would be monitored during a typical aircraft ground and flight operation. Landing gear axle deflection is measured in increments as small as fractions of millimeters ("mm"). Landing gear axle deflection is monitored against elapsed time.

In this graphical illustration, the empty weight of the aircraft relates to a right main landing gear axle deflection slightly more than 0.0200 mm. Landing gear Axle Deflection Pattern "A" will recognize a deflection within this lower range, with no further changes in deflection, and the aircraft is stationary, as time passes. This unchanging amount of deflection, at this minimal amount of deflection, along with the stationary aircraft will identify that the aircraft is at or near its minimal or empty weight.

With the further monitoring of axle deflection there will be shown a steady, but not necessarily "straight line" pattern of axle deflection, to create Axle Deflection Pattern "B". Axle Deflection Pattern "B" identifies the initial loading of weight onto the stationary aircraft. Loading may be interrupted and axle deflections could be intermittent.

When the loading of the aircraft is completed, the measured amount of axle deflection will stabilize and continue at this same deflection value as additional time passes. This horizontal "flat-lining" of monitored and measured deflection, at this higher deflection range, relates to the higher ranges of the aircraft weight limitations; and creates Axle Deflection Pattern "C". Axle Deflection Pattern "C" is further confirmed by being identified just prior to Axle Deflection Pattern "D". This is the time or the operational segment of the aircraft when to take the ramp weight of the aircraft. A request for taking the aircraft weight is made by calling the Aircraft Weight Determination "K" program.

Axle Deflection Pattern "D" identifies the aircraft as no longer stationary. The horizontal movement of the aircraft causes the landing gear axle bend with minor deflections to both the positive and negative. As the aircraft is moving, the aircraft engines are burning fuel. The reduction in aircraft weight, as a result of the burned fuel, is identified by the averaging of the high and low range of the multiple axle deflection measurements. The averaged deflection will trend slightly lower as the weight of the burned fuel is removed from the aircraft fuel tanks.

Depending upon weather conditions, the aircraft may require the application of de-icing fluid. De-icing fluid is applied while the aircraft is stationary, thus the axle deflection indicating aircraft movement will cease, allowing the amount of deflection to again stabilize. The stabilized deflection will slowly begin to increase as the weight of the de-icing fluid is applied to the aircraft, and is identified by Axle Deflection Pattern "E". Axle Deflection Pattern "E" is further confirmed by being identified immediately after Axle Deflection Pattern "D" and within a relatively short period of time before Axle Deflection Pattern "G.", which identifies the aircraft take-off roll. Axle Deflection Pattern "F" may also occur when the aircraft is in line waiting for take-off.

Axle Deflection Pattern "F" is identified by an again cessation of the landing gear axle deflection oscillation of the previous Axle Deflection Pattern "D", where axle deflection will again stabilize and slowly retreat, as additional fuel is burned to reduce aircraft weight to an amount that is below the Max-Takeoff Weight. Axle Deflection Pattern "F" is further confirmed by being identified just prior to Axle Deflection Pattern "G", which identifies the aircraft take-off roll. This is the time or the operational segment of the aircraft when to take the take-off weight of the aircraft. A request for taking the aircraft weight is made by calling the Aircraft Weight Determination "K" program.

Axle Deflection Pattern "G" identifies the beginning and ultimate completion of the aircraft take-off roll. Again, landing gear axle deflection will begin to oscillate, showing a pattern of positive and negative amounts of axle deflection, but in the case of Axle Deflection Pattern "G" the difference between the positive and negative amounts of deflection will slightly increase as well as the averaging of the total amount of deflection will trend sharply lower, as the aircraft increases speed and the lifting forces of the wings transfer weight from the landing gear to the aircraft wings.

As the aircraft takes-off and the landing gear strut are no longer in contact with the ground, the deflection of the landing gear axle will reduce to an amount equivalent with the weight of the landing gear tire assemblies, hanging from the bottom of the strut. Identification of this reduction of axle deflection immediately after the aircraft take-off identifies Axle Deflection Pattern "H".

A monitored and measured amount of axle deflection which stabilizes to that of an un-deflected landing gear axle identifies Axle Deflection Pattern "J".

As described herein, aircraft landing gear strut pressure is equivalent of the amount of landing gear axle deflection, as additional weight is applied to the strut, thus throughout the remaining portion of this Description of the Preferred Embodiment "strut pressure" and "axle deflection" are terms which can be considered synonymous.

Figure 7:
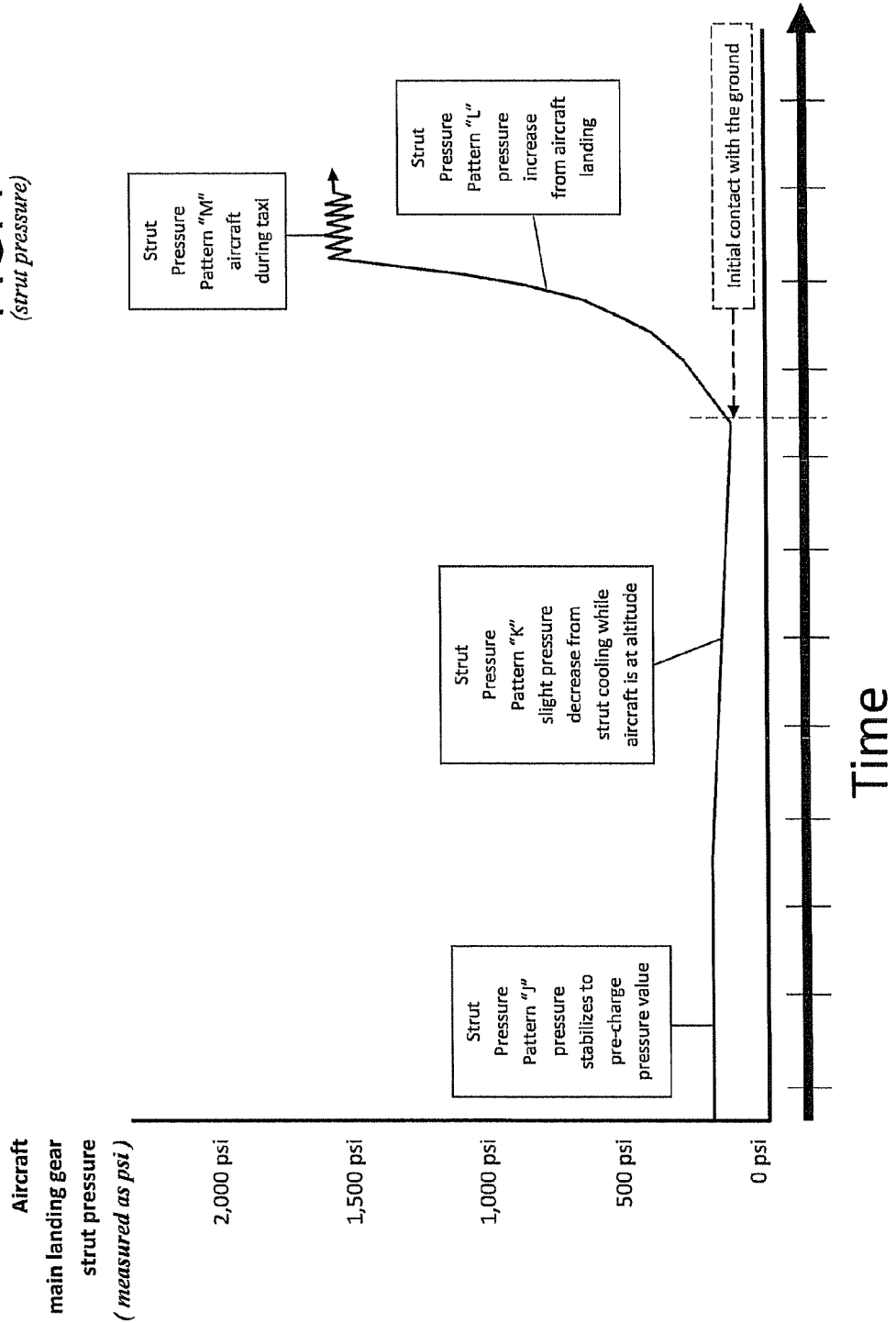
FIG. 7 illustrates the variations in the static and then changing internal landing gear strut pressure, as the aircraft lands.

Referring now to FIG. 7, there is shown a graph illustrating measured landing gear strut pressure, as it would be monitored during a typical aircraft flight and subsequent landing event. Landing gear strut pressure is measured as psi (pounds per square inch). Landing gear strut pressure is monitored in relation to elapsed time.

In this example, no portion of the weight of the aircraft is being applied to any of the landing gear struts, and the pressure patterns shown herein relate to a right main landing gear pressure initially measured in a range of 180 psi. This extremely low pressure value is recognized as the landing gear Strut Pressure Pattern "J" and will identify the strut pre-charge pressure, confirming the strut is extended to its full telescopic extension. While the aircraft remains in flight, at altitudes up to 30,000 feet; internal landing gear strut pressure will decrease slightly due to the extreme cold temperatures, as time passes. This relatively unchanging strut pressure, measured and monitored at this minimal pressure amount, will identify that the aircraft is in flight. As the aircraft makes initial contact with the ground, internal strut pressure will rapidly increase, during a very short period of time. This rapid pressure increase over such an extremely short period of time, identified immediately after a period of time monitored strut pressure at a range near the strut pre-charge pressure, will be recognized as Strut Pressure Pattern "L" being the aircraft landing event. At the conclusion of the rapid pressure increase of Strut Pressure Pattern "L" and then recognition of Strut Pressure Pattern "M" being strut pressure oscillation at a lower pressure range relating to an aircraft with less fuel, will identify the aircraft has landed. After taxiing, once the aircraft has stopped moving, a final weight determination is made, being the landing weight of the aircraft.

Figure 8:
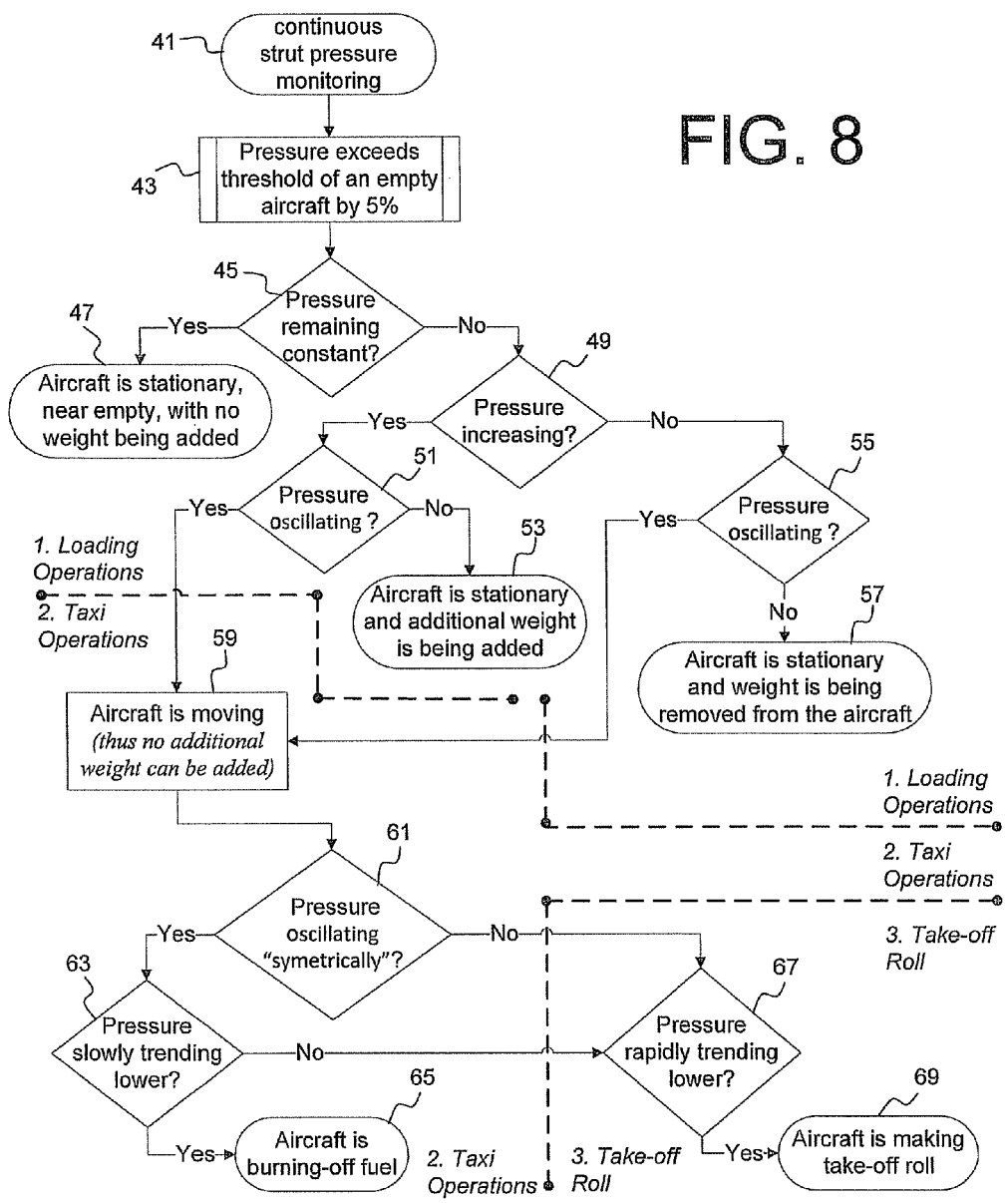
FIG. 8 illustrates a process design flow-chart of the order in which decisions are made based upon the monitoring of the aircraft landing gear strut pressure (or axle deflection) to determine at which point of an operation the aircraft is currently experiencing.

Referring now to FIG. 8 there is shown a flow chart, further illustrating the process for determining the various stages of the aircraft operations. This FIG. 8 is partitioned into three sections, which are separated by bold dashed lines:
1. Loading Operations
2. Taxi Operations
3. Take-off Roll The computer 7 monitors the pressure within both the main landing gear and the nose landing gear struts, step 41. While monitoring strut pressure, in a pressure range relating to the near the empty weight of the aircraft, the software will determine if monitored pressure has exceeded a pressure relating to a weight that is more than 5% greater than the "empty operating weight" of the aircraft, step 43. Once the 5% greater pressure threshold has been exceeded, the system will determine if the pressure is continuing to increase, or has stabilized and remains constant, step 45. If the pressure remains constant the computer will recognize the aircraft is stationary, with no additional weight being added, step 47. After step 47, step 41 is repeated. If the pressure is not remaining constant, the decision will be made to whether the pressure is increasing or decreasing, step 49. If the pressure is increasing (a YES result from step 49), the system will determine if the pressure is oscillating, step 51. Oscillating pressure within the landing gear strut is identified by minor pressure reversals, with such pressure reversals being symmetrical pressure increases, as compared to pressure decreases, with such pressure reversals occurring rapidly. If the pressure is not oscillating, the system will determine the aircraft is stationary and additional weight is being added, step 53. If pressure is oscillating, step 59 is performed (discussed below). If as a result of step 49, it is determined the pressure is decreasing, the system will determine if the pressure is oscillating, step 55. If the pressure is not oscillating, the system will determine the aircraft is stationary and weight is being removed from the aircraft, step 57. After steps 53 and 57, step 41 is repeated.

The previous steps occur when the aircraft undergoes loading (or unloading) operations. The next four steps will find the aircraft typically involved in taxi operations. Advancing further through the flow chart, if the pressure is oscillating (a YES result from either step 51 or 55), the computer software will determine that the aircraft is moving, step 59. Once the determination is made that the aircraft is moving, a further determination is made that no additional weight can be added while the aircraft is in motion. A further determination is made if the pressure oscillation is continuing in a symmetrical pattern, step 61. If the pressure is continuing in a symmetrical pattern, but slowly trending lower, step 63, the system will determine the aircraft is moving along an airport taxi-way and burning fuel, step 65. After step 65, step 41 is repeated. If the pressure oscillation is not symmetrical, and the weight of the aircraft is rapidly trending lower, step 67, the computer software will determine the aircraft is progressing through a take-off roll, step 69. After step 69, the system continues to monitor pressure for a short period of time to confirm that the aircraft has taken off.

Figure 9:
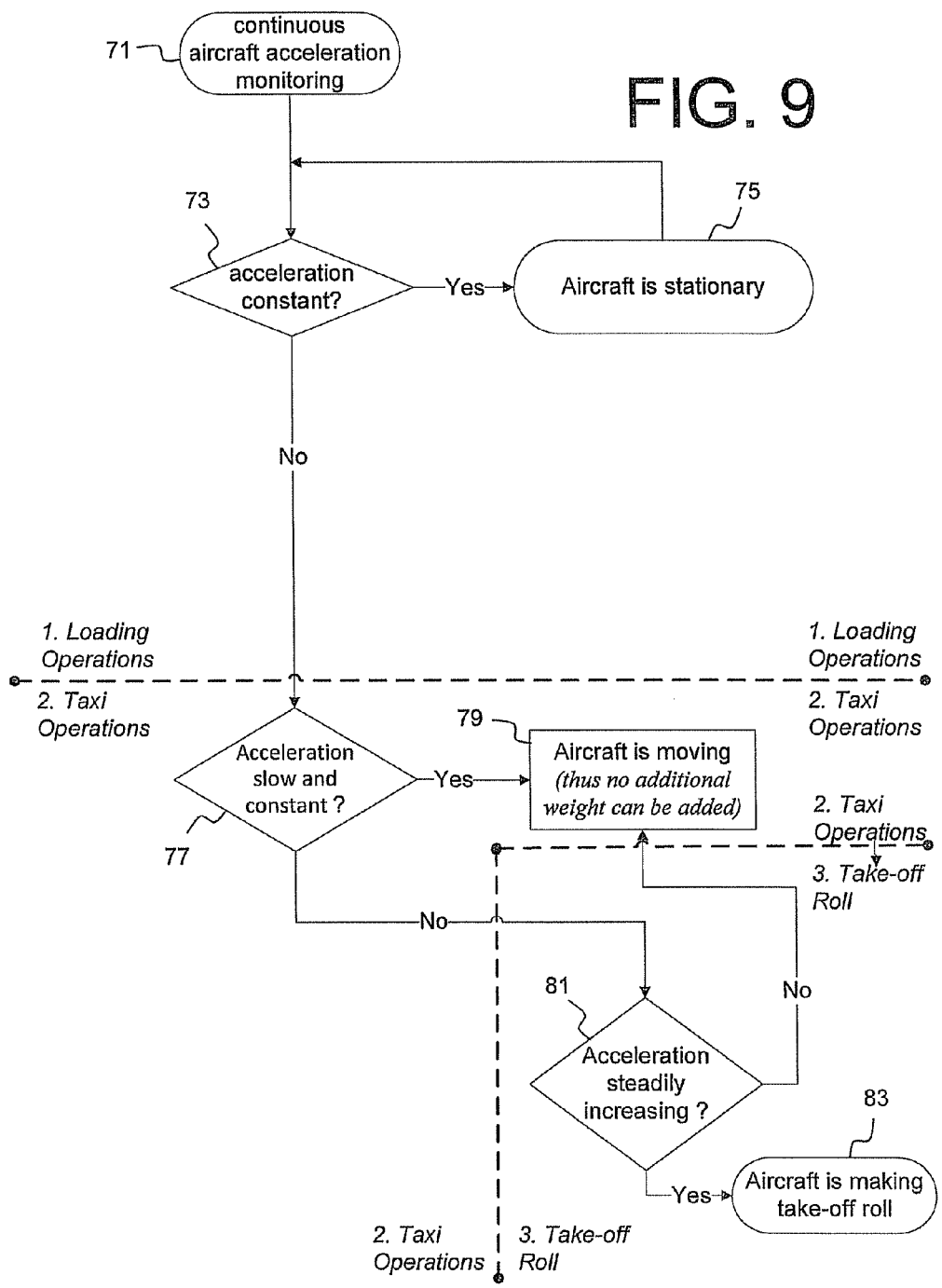
FIG. 9 illustrates a process design flow-chart of the order in which decisions are made based upon the monitoring of aircraft acceleration, to determine at which point of an operation the aircraft is currently experiencing.

Referring now to FIG. 9 there is shown there is shown another flow chart, further illustrating the process for determining the various stages of the aircraft operations. This FIG. 9 is again partitioned into three sections, which are separated by bold dashed lines:
1. Loading Operations
2. Taxi Operations
3. Take-off Roll The system's computer software monitors horizontal and vertical acceleration of the aircraft hull. This method of acceleration monitoring is a more simplified means of determining aircraft movement as to that of the monitoring of strut pressure, and can be used as a verification and cross-check feature to the monitoring of strut pressure; in determining the various stages of the aircraft operation.

With continuous monitoring of aircraft acceleration, step 71, the initial decision is made if any acceleration is detected, step 73. If no acceleration is detected (or acceleration is constant) from that of a stationary position, then the aircraft is considered to be stationary, step 75, and the addition of weight is possible. If acceleration from a stationary position is detected, step 73, the system will determine the aircraft is moving. If the determination is made that the aircraft is moving, a further determination is made that no additional weight can be added to the aircraft. Once the determination is made that the aircraft is moving, the determination is made if the acceleration for the aircraft hull is slow and constant, step 77. If the acceleration is slow and constant, the system will determine the aircraft is moving along an airport taxi-way, step 79. If the acceleration is not slow and constant, the system will determine if the acceleration is steadily increasing, step 81. If the acceleration is steadily increasing, and increasing to a high rate of speed, the system will determine the aircraft is making a take-off roll, step 83. If the acceleration is not steadily increasing, the system will determine that the aircraft is moving, step 79.

Figure 1A:
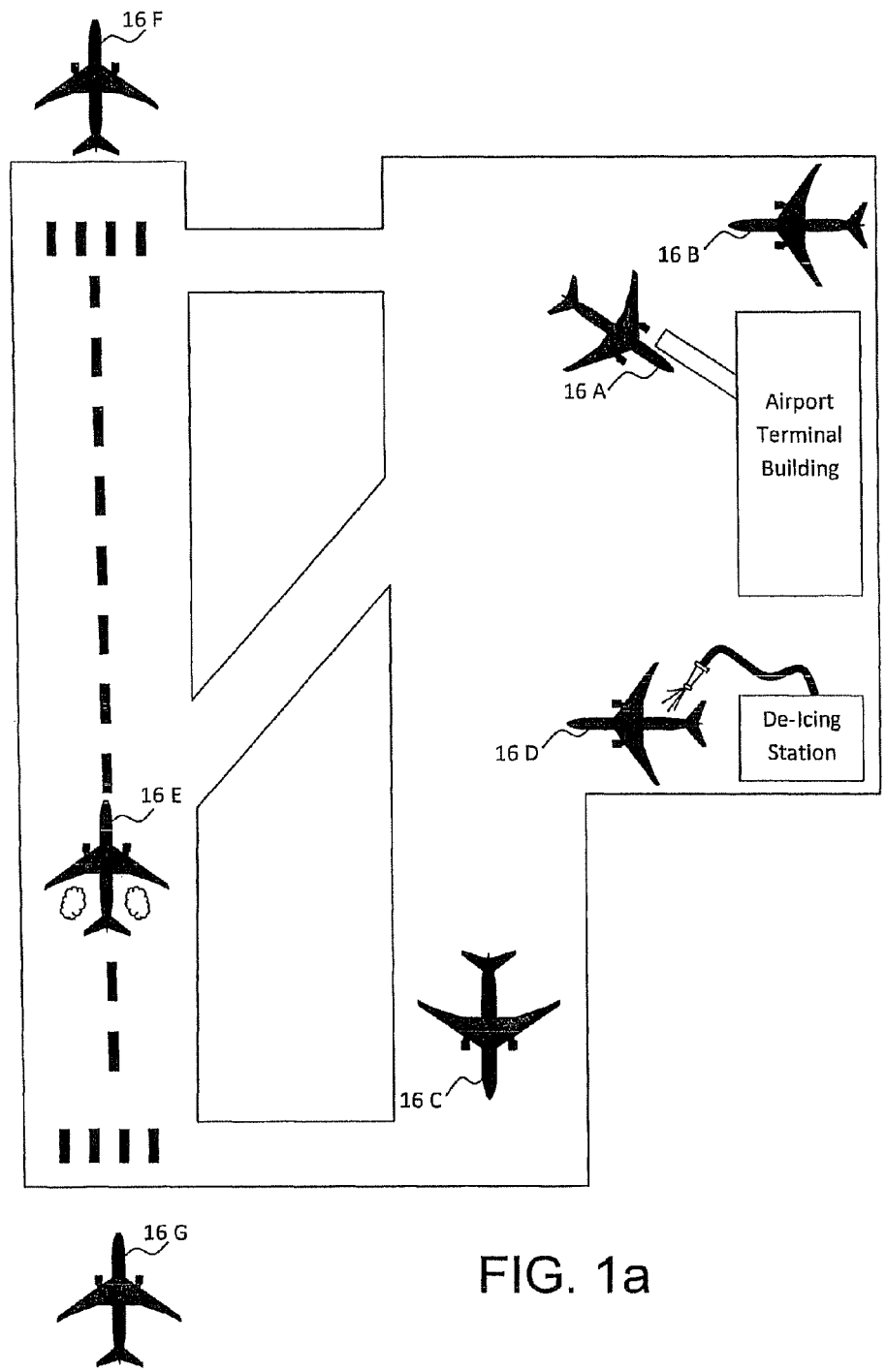
FIG. 1a is a plan view of an airport showing various operational locations of aircraft.

If GPS is used to monitor the location of the aircraft, the airport can be mapped. Referring to FIG. 1a, if the aircraft is at the terminal building or on the apron near the terminal building, and not moving, then the aircraft is either empty, being loaded, or loaded and ready to depart. An aircraft may be pushed back from a gate by a ground vehicle. The push back location can be mapped by GPS coordinates. Once the aircraft is pushed back, it pauses; the ramp weight can be taken at this time. The take-off weight can be taken when the aircraft reaches any point on the taxi, such as just before the aircraft turns onto the runway. The landing weight can be taken when the aircraft returns to a gate. All of these locations are mapped by GPS coordinates.

Additionally, as an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

The invention claimed is:

1. A method of determining when to automatically activate an onboard aircraft weight system in an aircraft, the aircraft having landing gear struts, comprising the steps of:
   a) providing landing gear sensors;
   b) measuring the aircraft movement over time with the landing gear sensors while the aircraft is on the ground and obtaining aircraft load and movement data, with the load and movement data selected from the group consisting of landing gear strut pressures, deflection of wheel axles of the landing gear struts and movement of landing gear struts;
   c) storing the aircraft load and movement data;
   d) determining from the stored load and movement data a specified pattern of aircraft movement;
   e) based upon the specified pattern, requesting that a determination of the aircraft weight be made by the onboard weight system.

2. The method of claim 1, wherein the step of measuring the aircraft movement further comprises the step of measuring fluid pressure in the landing gear struts.

3. The method of claim 1, wherein the aircraft landing gear comprises wheels mounted on the respective wheel axles, wherein the step of measuring the aircraft movement further comprises the step of measuring deflection of at least one of the wheel axles.

4. The method of claim 1 wherein the step of measuring the aircraft movement further comprises the step of measuring the acceleration of the aircraft.

5. The method of claim 1 wherein the landing gear struts further comprise strut linkages, wherein the step of measuring the aircraft movement further comprises the step of measuring the movement of the strut linkages on at least one of the landing gear struts.

6. The method of claim 1 wherein the step of measuring the aircraft movement further comprises the step of measuring the movement of the aircraft using a global positioning satellite receiver.

7. The method of claim 1 wherein the step of determining a specified pattern of aircraft movement further comprises the step of determining when the aircraft is located at a loading station.

8. The method of claim 7 wherein the step of requesting that a determination of the aircraft weight be made further comprises the step of requesting that a determination of a ramp weight of the aircraft be made.

9. The method of claim 1 wherein the step of determining a specified pattern of aircraft movement further comprises the step of determining when the aircraft is near take-off.

10. The method of claim 9 wherein the step of requesting that a determination of the aircraft weight be made further comprises the step of requesting that a determination of a take-off weight of the aircraft be made.

11. The method of claim 1 wherein the step of determining a specified pattern of aircraft movement further comprises the step of determining when the aircraft has landed after a flight.

12. The method of claim 11 wherein the step of requesting that a determination of the aircraft weight be made further comprises the step of requesting that a determination of a landing weight of the aircraft be made.

13. The method of claim 1 wherein:
   a) the step of determining a specified pattern of aircraft movement further comprises the step of determining when the aircraft is near take-off;
   b) the step of requesting that a determination of the aircraft weight be made further comprises the step of requesting that a determination of a take-off weight of the aircraft be made;
   c) the step of determining a specified pattern of aircraft movement further comprises the step of determining when the aircraft has landed after a flight;
   d) the step of requesting that a determination of the aircraft weight be made further comprises the step of requesting that a determination of a landing weight of the aircraft be made.

14. The method of claim 1, further comprising the step of using the load data to determine aircraft weight.

* * * * *